(12) United States Patent
Yasuda (10) Patent No.: US 7,679,231 B2
(45) Date of Patent: Mar. 16, 2010

(54) DRIVING DEVICE AND LIGHT AMOUNT CONTROLLER

(75) Inventor: Hiromu Yasuda, Yokohama (JP)

(73) Assignee: Canon Kabushiki Kaisha (JP)

( * ) Notice: Subject to any disclaimer, the term of this patent is extended or adjusted under 35 U.S.C. 154(b) by 677 days.

(21) Appl. No.: 11/460,108

(22) Filed: Jul. 26, 2006

(65) Prior Publication Data

US 2007/0063591 A1    Mar. 22, 2007

(30) Foreign Application Priority Data

Jul. 26, 2005    (JP) ............................. 2005-216060

(51) Int. Cl.
*H02K 37/12* (2006.01)
*H02K 41/00* (2006.01)
*G03B 9/08* (2006.01)

(52) U.S. Cl. .................... 310/49 R; 310/12; 396/469

(58) Field of Classification Search ................... 310/69, 310/154.01, 49 R, 12; *H02K 21/40, 21/42, H02K 21/44, 21/38, 37/20*
See application file for complete search history.

(56) References Cited

U.S. PATENT DOCUMENTS

| | | | | |
|---|---|---|---|---|
| 4,173,569 A | * | 11/1979 | Banfi et al. .................. | 548/544 |
| 4,280,072 A | | 7/1981 | Gotou et al. | |
| 4,438,362 A | | 3/1984 | Brown | |
| 4,713,569 A | * | 12/1987 | Schwartz ..................... | 310/152 |
| 2001/0024156 A1 | * | 9/2001 | Kuratani ..................... | 338/160 |
| 2002/0127013 A1 | * | 9/2002 | Mizumaki et al. ........... | 396/463 |
| 2006/0008270 A1 | * | 1/2006 | Naganuma .................. | 396/469 |
| 2006/0043800 A1 | * | 3/2006 | Yasuda ...................... | 310/49 R |

FOREIGN PATENT DOCUMENTS

| | | |
|---|---|---|
| JP | 41-10722 | 5/1966 |
| JP | 62-060453 A | 3/1987 |
| JP | 62060453 A * | 3/1987 |
| JP | 6-165468 A | 6/1994 |
| JP | 06165468 A * | 6/1994 |

(Continued)

OTHER PUBLICATIONS

English language abstract JP62060453 (1987).*

(Continued)

*Primary Examiner*—Quyen Leung
*Assistant Examiner*—Jose A Gonzalez Quinones
(74) *Attorney, Agent, or Firm*—Rossi, Kimms & McDowell LLP (57) ABSTRACT

A driving device which makes it possible to reduce the moment of inertia of a rotor and increase torque. A magnet is formed to have a hollow cylindrical shape and has magnetized sections which are magnetized to have alternately different poles in a circumferential direction thereof. A coil is wound coaxially with the magnet and is disposed in axially side-by-side relation to the magnet. A stator yoke is formed of a soft magnetic material and fixes the magnet and the coil. A rotor yoke is formed of a soft magnetic material, and has magnetic pole portions formed in opposed relation to the magnetized sections, for being magnetized by the coil. The rotor yoke is supported in a manner rotatable with respect to the stator yoke. An rotation restricting part limits a range of rotation of the rotor yoke within a predetermined angle.

12 Claims, 9 Drawing Sheets

FOREIGN PATENT DOCUMENTS

| | | |
|---|---|---|
| JP | 2002-49076 A | 2/2002 |
| JP | 2002-272082 A | 9/2002 |
| JP | 2003-189575 A | 7/2003 |
| JP | 2005-151637 A | 6/2005 |

OTHER PUBLICATIONS

Machine Translation JP06165468 (1994).*
Office Action issued in corresponding Taiwanese Patent Application No. 095126755 dated Jun. 3, 2009.

* cited by examiner

FIG. 3A
MOVABLE RANGE

DRIVING DEVICE AND LIGHT AMOUNT CONTROLLER

BACKGROUND OF THE INVENTION

1. Field of the Invention

The present invention relates to a driving device configured to rotate a rotor yoke, and a light amount controller incorporating the driving device as a drive source thereof.

2. Description of the Related Art

Conventionally, there have been proposed various types of small-sized and slim driving devices (see e.g. Japanese Laid-Open Patent Publications (Kokai) No. 2002-272082 and No. 2002-049076). Now, FIGS. 8 and 9 show a conventional driving device disclosed in Japanese Laid-Open Patent Publications (Kokai) No. 2002-272082.

Figure 8:
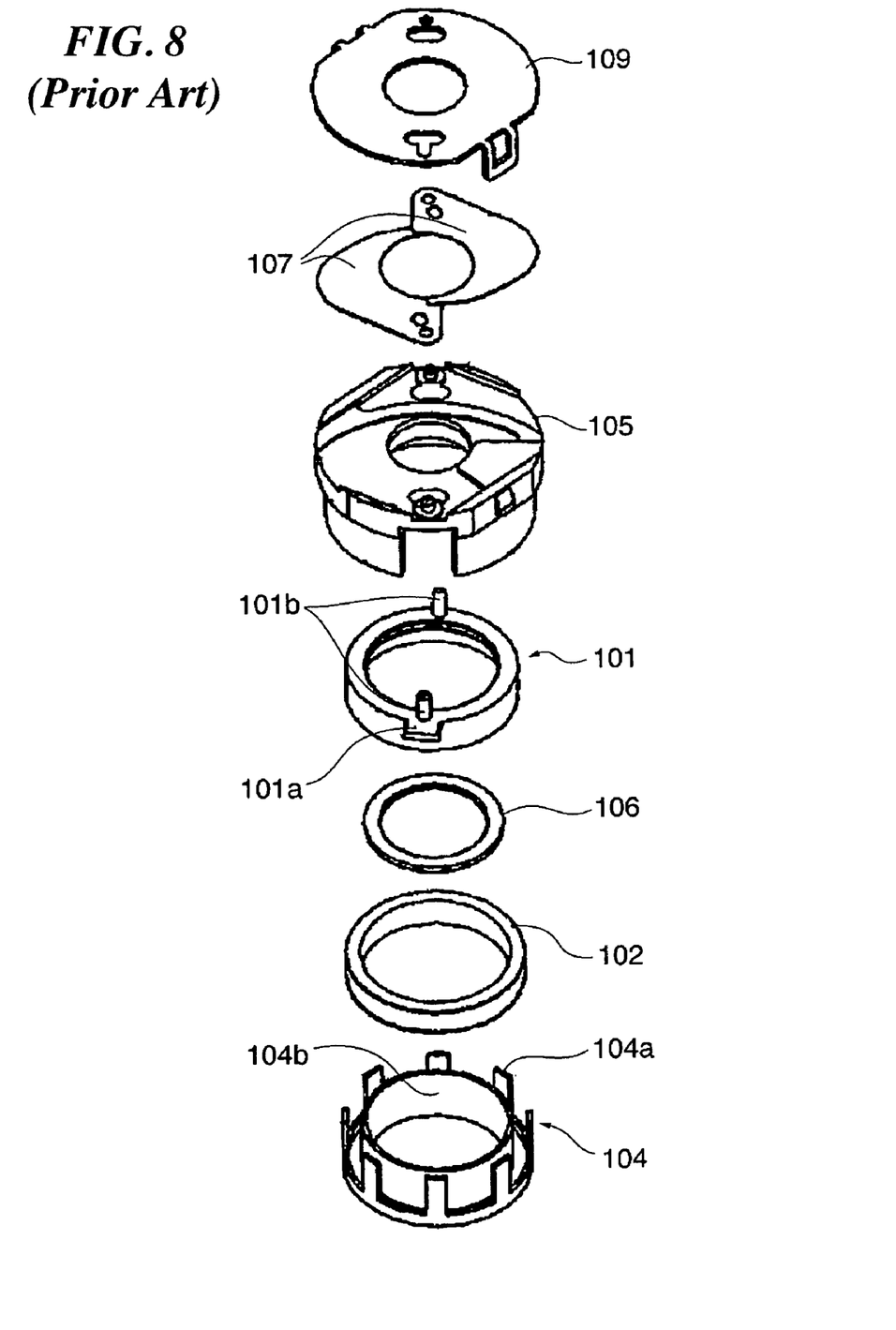
FIG. 8 is an exploded perspective view of a conventional driving device.

FIG. 8 is an exploded perspective view of the conventional driving device. FIG. 9 is a cross-sectional view in the axial direction of the driving device in an assembled state thereof.

Figure 9:
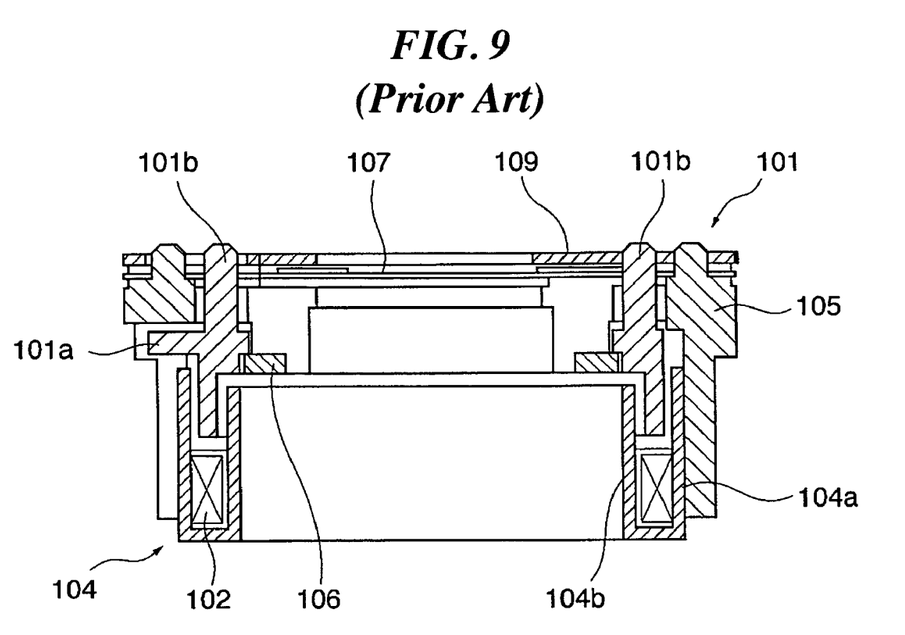
FIG. 9 is a cross-sectional view in the axial direction of the driving device in FIG. 8 in an assembled state thereof.

As shown in FIGS. 8 and 9, the driving device is comprised of a magnet 101, a coil 102, a stator 104, a base plate 105, a magnet presser 106, shutter blades 107, and a cover 109.

The magnet 101 is in the form of a hollow cylinder, is configured to pivotally move, and has an outer peripheral surface circumferentially divided into n sections magnetized to have alternately different poles. The magnet 101 is formed with a rotation restricting pin 101a and output pins 101b. The coil 102 is disposed coaxially with the magnet 101. The stator 104 is formed of a soft magnetic material, for being magnetized by the coil 102, and includes comb tooth-shaped outer magnetic pole portions 104a and a hollow cylindrical inner magnetic pole portion 104b. The outer magnetic pole portions 104a of the stator 104 are opposed to the outer peripheral surface of the magnet 101, while the inner magnetic pole portion 104b of the stator 104 is opposed to the inner peripheral surface of the magnet 101.

In the driving device, the polarity of the outer magnetic pole portions 104a and that of the inner magnetic pole portion 104b are switched by changing the direction of energization of the coil 102, whereby the magnet 101 is angularly reciprocated within a limited range.

In the driving device configured as above, magnetic flux generated by energization of the coil 102 flows from each of the outer magnetic pole portions 104a to the opposed inner magnetic pole portion 104b, or reversely flows from the inner magnetic pole portion 104b to each of the outer magnetic pole portions 104a, to effectively act on the magnet 101 located between the outer magnetic pole portions 104a and the inner magnetic pole portion 104b. The distance between the outer magnetic pole portions 104a and the inner magnetic pole portion 104b can be set to the sum of the thickness of the magnet 101, the clearance between the magnet 101 and each outer magnetic pole portion 104a, and the clearance between the magnet 101 and the inner magnetic pole portion 104b, which makes it possible to reduce the resistance of a magnetic circuit formed by each outer magnetic pole portion 104a and the inner magnetic pole portion 104b. As a result, a large amount of magnetic flux can be generated by a small amount of electric current, which makes it possible to enhance the efficiency of the driving device.

There is an increasing demand for utilization of the above-described conventional driving device as a drive source of a light amount controller, such as a shutter mechanism or a diaphragm mechanism in cameras, for achieving high-speed driving of the shutter mechanism or the diaphragm mechanism. However, since the conventional driving device employs the hollow cylindrical magnet as the rotor, there is a limit to reduction of the moment of inertia, which makes it difficult to increase the driving speed of the above-mentioned mechanism.

Another problem is that although the torque of the driving device can be enhanced by increasing the thickness of the magnet and thereby obtaining a stronger magnetic force, the increased thickness of the magnet leads to an increase in the moment of inertia of the rotor, which makes it impossible to achieve high-speed driving of the above-mentioned mechanism.

Further, in the conventional driving device, the number of component parts is reduced by forming the rotation restricting pin 101a and the output pins 101b of the magnet 101 out of a plastic magnetic material, but the plastic magnetic material is more fragile than a metal or a resin, so that the pins are often broken by a physical shock. To prevent this, it is necessary to form the pins using a material other than the plastic magnetic material. However, when another material is used, reduction of the number of component parts and enhancement of rigidity of the output pins become incompatible.

SUMMARY OF THE INVENTION

It is an object of the present invention to provide a driving device which makes it possible to reduce the moment of inertia of a rotor and increase torque, and a light amount controller incorporating the driving device as a drive source thereof.

To attain the above object, in a first aspect of the present invention, there is provided a driving device comprising a magnet that is formed to have a hollow cylindrical shape and has magnetized sections which are magnetized to have alternately different poles in a circumferential direction thereof, a coil that is wound coaxially with the magnet and is disposed in axially side-by-side relation to the magnet, a stator that is formed of a soft magnetic material and has the magnet and the coil fixed thereto, a rotor that is formed of a soft magnetic material, and has magnetic pole portions formed in opposed relation to the magnetized sections, for being magnetized by the coil, the rotor being supported in a manner rotatable with respect to the rotor, and a rotation restricting part that limits a range of rotation of the rotor within a predetermined angle.

With the arrangement of the driving device according to the first aspect of the present invention, the rotor is used as a rotary member, differently from the conventional case where a magnet is used as the rotary member, it is possible to reduce the moment of inertia. Further, even if the thickness of the magnet is increased so as to enhance the torque of the driving device, the moment of inertia of the rotor cannot be adversely affected, so that achievement of high torque and reduction of the moment of inertia become compatible.

Preferably, the predetermined angle is not more than an angle obtained by dividing 360 degrees by the number of magnetic poles of the magnetized sections of the magnet.

Preferably, the magnetic pole portions of the rotor each have a comb-tooth shape formed by cutting out lateral portions of the rotor.

Preferably, the magnet has the magnetized sections provided in an inner peripheral surface thereof, and is disposed on an outer periphery side of the rotor.

Preferably, the magnet has the magnetized sections provided in an outer peripheral surface thereof, and is disposed on an inner periphery side of the rotor.

Preferably, a rotation drive method of the rotor is selected from the group consisting of a method of switching an angular position of the rotor respective positions of opposed ends of the range of rotation of the rotor set within the predetermined angle, a method of switching the angular position of the rotor the respective positions of the opposed ends of the range of rotation of the rotor and a position between the opposed ends, and a method of continuously switching the angular position of the rotor within the range of rotation of the rotor.

To attain the above object, in a second aspect of the present invention, there is provided a light amount controller comprising the driving device according to the first aspect of the present invention, a fixing member that has an opening, and has the stator of the driving device fixed thereto, and a light amount control member that is driven by the rotor of the driving device, and controls an amount of opening of the opening of the fixing member.

With the arrangement of the light amount controller according to the second aspect of the present invention, since the driving device according to the first aspect of the present invention is used as a drive source thereof, it is possible to achieve high-speed driving of the light amount controller.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

First, a description will be given of a first embodiment of the present invention.

Figure 1:
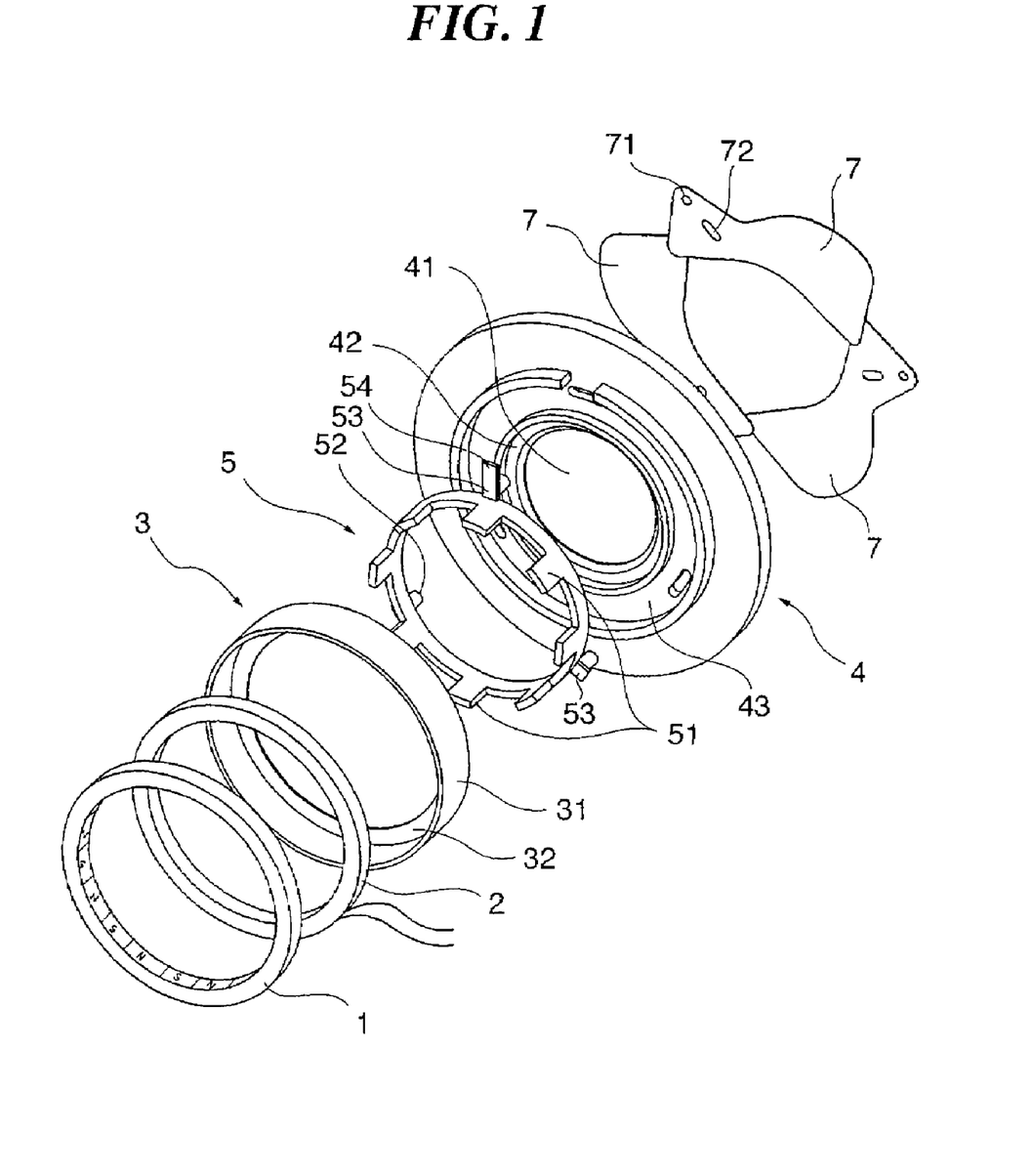
FIG. 1 is an exploded perspective view of a light amount controller according to a first embodiment of the present invention.
Figure 2:
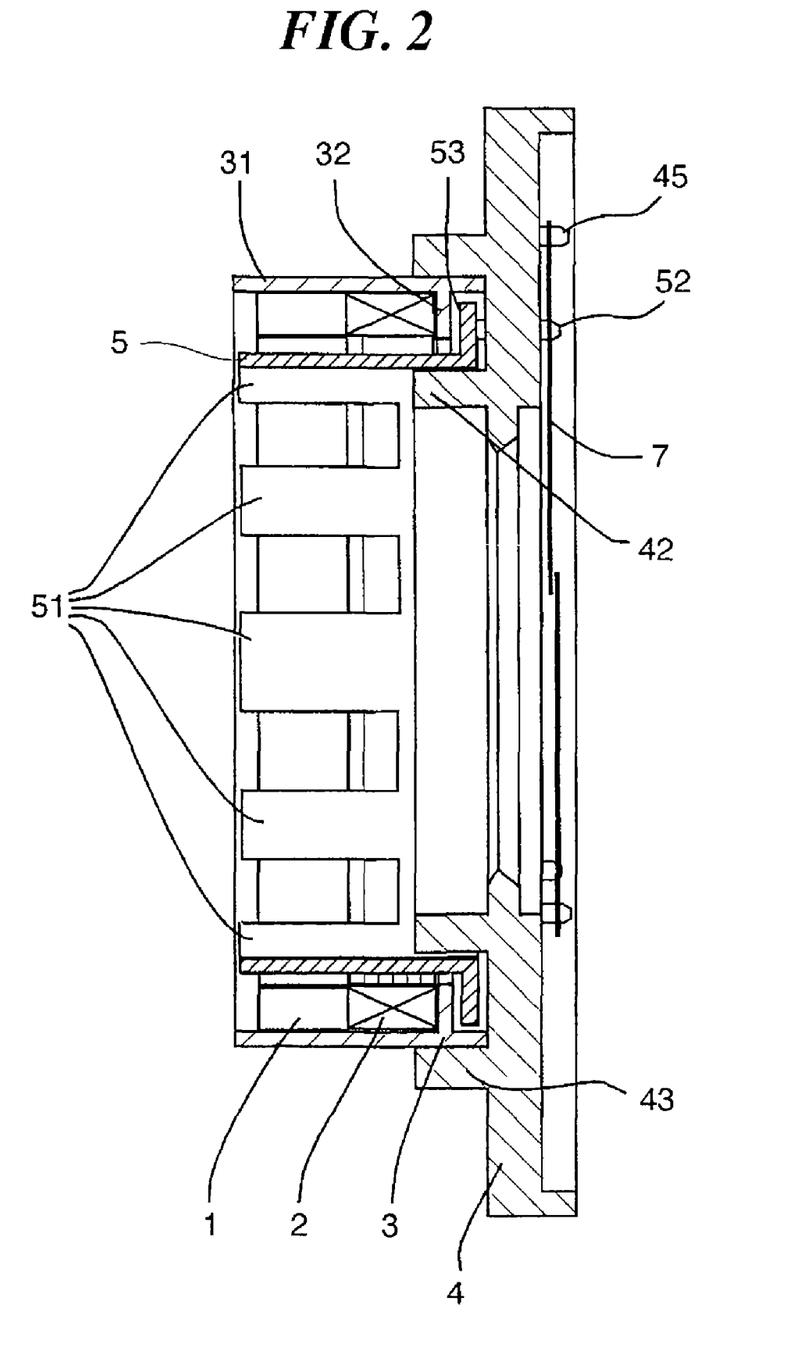
FIG. 2 is a cross-sectional view in the axial direction of the light amount controller in FIG. 1 in an assembled state thereof.
Figure 3A:
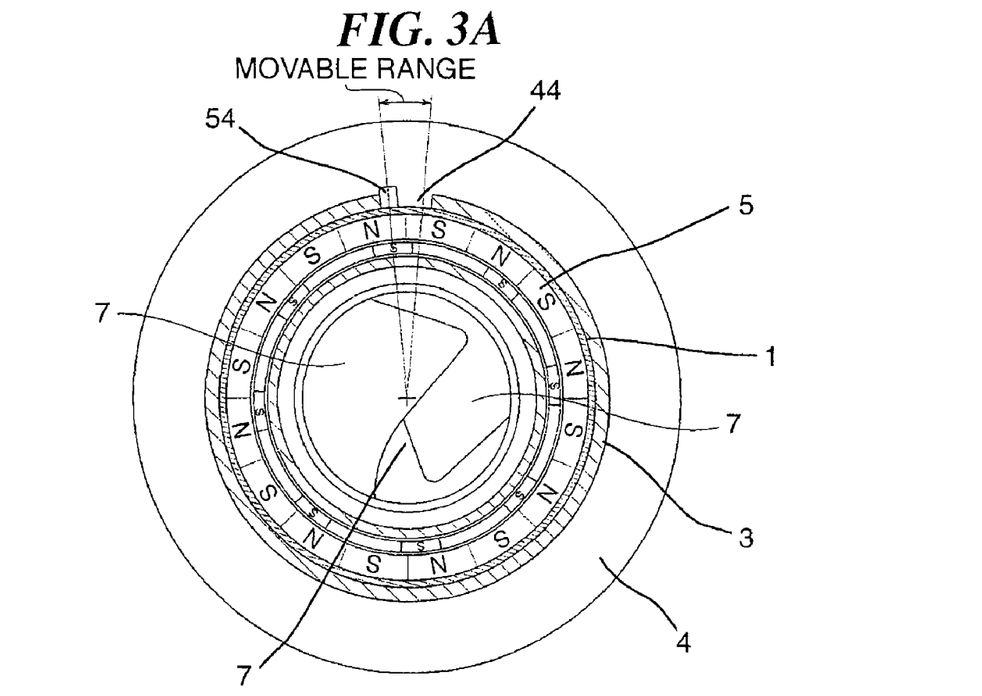
FIG. 3A is a front view of the light amount controller in FIG. 2 with shutter blades thereof closed.
Figure 3B:
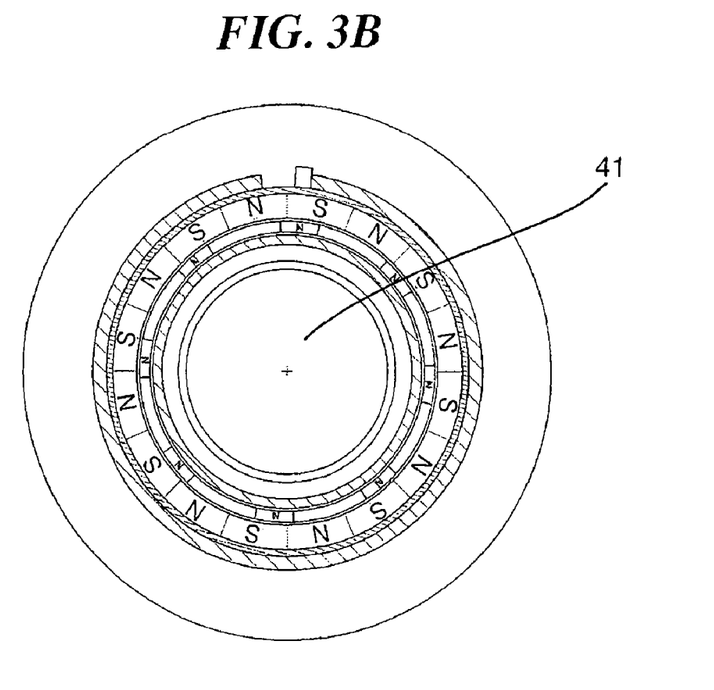
FIG. 3B is a front view of the light amount controller in FIG. 2 with the shutter blades thereof open.

FIG. 1 is an exploded perspective view of a light amount controller according to the first embodiment. FIG. 2 is a cross-sectional view in the axial direction of the light amount controller in FIG. 1 in an assembled state thereof. FIG. 3A is a front view of the light amount controller with shutter blades thereof closed. FIG. 3B is a front view of the light amount controller with the shutter blades thereof open.

As shown in FIGS. 1 to 3, the light amount controller is comprised of a light amount adjusting mechanism including a base plate 4 and the shutter blades 7, and a driving device including a magnet 1, a coil 2, a stator yoke 3, and a rotor yoke 5.

The magnet 1 is in the form of a hollow cylinder, and has an inner peripheral surface thereof, as magnetized sections, circumferentially divided into n sections (16 sections in the present embodiment) which are magnetized such that they have alternately different S and N poles (inner-periphery magnetization). The magnet 1 is disposed on an outer periphery side of the rotor yoke 5 when the light amount controller is assembled (see FIG. 2).

The coil 2 is formed by numerous lead wires wound into a generally hollow cylindrical form, and is disposed coaxially with the magnet 1 in axially side-by-side relation thereto when the light amount controller is assembled. As shown in FIG. 2, the coil 2 is configured to have an outer diameter approximately equal to that of the magnet 1, and an inner diameter approximately equal to that of the magnet 1.

The stator yoke 3 is formed of a soft magnetic material such that it has a generally hollow cylindrical shape, and is comprised of a hollow cylindrical part 31 and a top plate part 32 formed along the inner periphery of the hollow cylindrical part 31 such that it extends radially inward. The hollow cylindrical part 31 is configured to have an inner diameter approximately equal to the outer diameter of the magnet 1. The top plate part 32 is configured to have an inner diameter slightly smaller than that of the magnet 1. The magnet 1 and the coil 2 are rigidly fitted in the inside of the stator yoke 3.

The base plate 4 is generally disk-shaped, and is comprised of an opening 41 formed in a center thereof, a rotor bearing part 42 formed radially outward of the opening 41 to define the opening 41, and a stator yoke fixing part 43 formed radially outward of the rotor bearing part 42. The stator yoke fixing part 43 has the stator yoke 3 fixed thereto. Further, the stator yoke fixing part 43 is provided with a rotation restricting part 44, which is formed by cutting out a portion thereof as shown in FIG. 3A, whereby the stator yoke fixing part 43 plays the role of a rotation restricting section. More specifically, the movement of a rotation stopper pin 54 of the rotor yoke 5 is restricted by two opposed end faces of the stator yoke fixing part 43 defining the rotation restricting part 44 (cutout). Further, a surface of the base plate 4 on the opposite side (shutter blade mounting side) from the stator yoke fixing part 43 has e.g. three dowels (small projections) 45 formed thereon in a manner projecting therefrom (see FIG. 2).

The rotor yoke 5 is formed of a soft magnetic material, and has a generally hollow cylindrical shape. The rotor yoke 5 includes a plurality of magnetic pole portions 51 formed by axially cutting out lateral portions thereof such that each magnetic pole portion has a comb-tooth shape. Each of the magnetic pole portions 51 has an axial length larger than that of the magnet 1, and an arc length (tooth width) smaller than that of each magnetized section of the magnet 1. The number of the magnetic pole portions 51 can be set to one to n/2 (n represents the number of magnetic poles of the magnet 1), and in the present embodiment, it is set to eight.

Further, the rotor yoke 5 includes e.g. three base parts 53 extending radially outward from the outer periphery thereof on the axially opposite side from the magnetic pole portions 51, and e.g. three shutter drive pins 52 axially projecting from the respective base parts 53 in a direction away from magnetic pole portions 51. One of the three base parts 53 has the rotation stopper pin 54 formed integrally therewith as a single piece in the present embodiment, by way of example, such that it projects radially outward therefrom. In the present embodiment, the shutter drive pins 52 and the rotation stopper pin 54 are formed of a ferrous material, such as pure iron or silicon steel, as a soft magnetic material.

The shutter blades 7 are formed of a light material having a light-blocking property, and are provided e.g. as three members. The shutter blades 7 function as a light amount adjusting member for adjusting the amount of opening of the opening 41 of the base plate 4, i.e. the amount of light passing through the opening 41. Each of the shutter blades 7 is formed with a round hole 71 in which a corresponding one of the dowels 45 of the base plate 4 is fitted, and a slot 72 in which a corresponding one of the shutter drive pins 52 of the rotor yoke 5 is fitted. Although in the present embodiment, the light amount adjusting member is formed by the three shutter blades 7, the number of the shutter blades 7 is not limited to three.

The shutter blades 7 are rotatably supported on the base plate 4 by having the dowels 45 of the base plate 4 fitted in the respective round holes 71 thereof. Further, the shutter drive pins 52 of the rotor yoke 5 are slidably fitted in the respective slots 72, whereby each of the shutter blades 7 can rotate about the associated round hole 71 in accordance with rotation of the rotor yoke 5. The amount of light passing through the opening 41 can be adjusted by rotations of the respective shutter blades 7. The axial position of each of the shutter blades 7 is restricted by a rear cover, not shown, mounted on the base plate 4.

In the light amount controller according to the present embodiment, the stator of the driving device is formed by rigidly fitting the stator yoke 3 in the base plate 4 and rigidly fitting the coil 2 and the magnet 1 along the inner periphery of the stator yoke 3. On the other hand, the rotor or rotary member of the driving device is formed by rotatably fitting the rotor yoke 5 in the stator, i.e. the stator yoke 3. In this case, the driving device is configured such that the magnetic pole portions 51 of the rotor yoke 5 are positioned in an opposed relation to the magnetized sections of the magnet 1.

In the present embodiment, the inner periphery of the rotor yoke 5 is radially supported by the rotor bearing part 42 of the base plate 4, and the base parts 53 of the rotor yoke 5 are sandwiched between the base plate 4 and the top plate part 32 of the stator yoke 3, whereby axial positioning is achieved (see FIG. 2). However, this is not limitative, but any method can be employed insofar as the rotor yoke 5 can be rotatably supported with respect to the stator yoke 3.

The rotor (rotor yoke 5) of the driving device can perform rotation with respect to the stator (stator yoke 3) within a predetermined angle range. The predetermined angle range is not larger than 360/n degrees. The reason for this will be described hereinafter. In the present embodiment, as shown in FIG. 3A, the rotation stopper pin 54 of the rotor yoke 5 is brought into contact with the end face of the rotation restricting part 44 of the base plate 4, whereby the rotor (rotor yoke 5) movable range (rotational angle range) is limited.

Next, the operation of the light amount controller constructed as above, for causing rotation of the rotor (rotor yoke 5) by switching the direction of energization of the coil 2 of the driving device will be described with reference to FIGS. 4 and 5.

Magnetic flux generated by energization of the coil 2 extends round through the hollow cylindrical part 31 of the stator yoke 3, the top plate part 32 of the same, each magnetic pole portion 51 of the rotor yoke 5, and the magnet 1, to form a loop. As a consequence, the magnetic pole portions 51 of the rotor yoke 5 are magnetized, and hence the rotor yoke 5 receives torque due to magnetic action between the magnetic pole portions 51 and the magnet 1. Since the magnetized sections of the magnet 1 and the magnetic pole portions 51 of the rotor yoke 5 are opposed to each other with a slight clearance, it is possible to increase a magnetic force acting therebetween.

Figure 4:
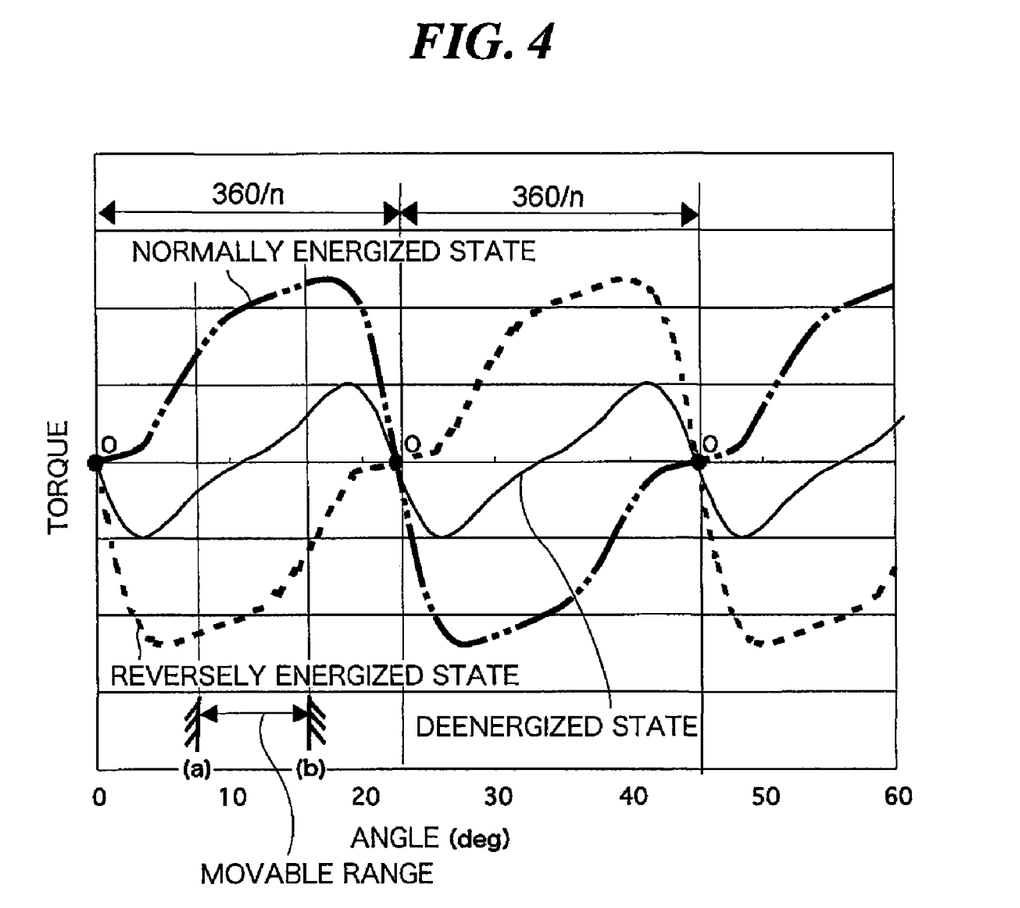
FIG. 4 is a diagram illustrating torque acting on a rotor yoke of the light amount controller when the light amount controller employs a two-position switching method.

FIG. 4 is a diagram showing torque acting on the rotor yoke 5 of the light amount controller when the light amount controller employs a two-position switching method.

Referring to FIG. 4, torque that acts on the rotor yoke 5 is generated by a magnetic force generated between the magnet 1 and the magnetic pole portions 51 of the rotor yoke 5. The ordinate in FIG. 4 represents torque acting on the rotor yoke 5, and the abscissa represents the angular position of the rotor yoke 5. A characteristic curve indicated by a two-dot chain line represents torque acting on the rotor yoke 5 when the coil 2 is energized in the normal direction, and a characteristic curve indicated by a dotted line represents torque acting on the rotor yoke 5 when the coil 2 is energized in the reverse direction. Further, a characteristic curve indicated by a solid line represents torque in a state where the coil 2 is deenergized. In FIG. 4, torque acting outside the rotor movable range limited by the rotation restricting part 44 of the base plate 4 is also shown for convenience of description.

When torque assumes a positive value, the rotor yoke 5 rotates clockwise as viewed in FIGS. 3A and 3B, whereas when torque assumes a negative value, the rotor yoke 5 rotates counterclockwise as viewed in FIGS. 3A and 3B. At a point (shown as a point O in FIG. 4) where the center of the pole of each magnetized section of the magnet 1 and the center of each magnetic pole portion 51 of the rotor yoke 5 are opposed to each other, the value of torque acting on the rotor yoke 5 is equal to 0 in all of the case where the coil 2 is normally energized, the case where the coil 2 is reversely energized, and the case where the coil 2 is deenergized.

If the point (position) where the above-mentioned centers are opposed to each other is within the rotor movable range, when the rotor yoke 5 is brought to this position and stopped, the rotor yoke 5 becomes incapable of operation. Since the inner peripheral surface of the magnet 1 is circumferentially divided into the n sections and each of the sections is magnetized, the point where the centers are opposed to each other appears at angular intervals of 360/n degrees (n represents the number of magnetic poles, and is equal to 22.5° in the present embodiment). Therefore, to avoid the rotor yoke 5 from stopping at the point where the centers are opposed, the rotor movable range is required to be set within 360/n°.

In the present embodiment, the rotor movable range is set to a range shown in FIG. 4, whereby during normal energization of the coil 2, torque acting in the direction of normal rotation can be always applied to the rotor yoke 5, and during reverse energization of the coil 2, torque acting in the direction of reverse rotation can be always applied to the rotor yoke 5.

When the coil 2 is normally energized, the rotor yoke 5 receives torque acting clockwise and rotates until the rotation stopper pin 54 of the rotor yoke comes into abutment with one (the right one as viewed in FIGS. 3A and 3B) of the end faces of the rotation restricting part 44 of the base plate 4. This state is shown in FIG. 3B, and the angular position of the rotor yoke 5 at this time is indicated by a symbol (b) in FIG. 4. Even when the coil 2 is deenergized in this angular position, positive torque still acts on the rotor yoke 5 as is apparent from FIG. 4. As a consequence, the rotor yoke 5 is pressed against the rotation restricting part 44 of the base plate 4, whereby the position can be maintained even in the deenergized state. According to the above-described process, the shutter blades 7 are driven by the respective associated shutter drive pins 52 of the rotor yoke 5 into a state retreated from the opening 41 (i.e. an open state).

Then, when the coil 2 is reversely energized, the rotor yoke 5 receives torque acting counterclockwise and rotates until the rotation stopper pin 54 comes into abutment with the other end face (the left one as viewed in FIGS. 3A and 3B) of the rotation restricting part 44 of the base plate 4. This state is shown in FIG. 3A, and the angular position of the rotor yoke 5 at this time is indicated by a symbol (a) in FIG. 4. Even when the coil 2 is deenergized in this angular position, similarly to the above case, the rotor yoke 5 is pressed against the rotation restricting part 44 of the base plate 4, whereby the position can be maintained even in the deenergized state. According to the above-described process, the shutter blades 7 are driven by the respective associated shutter drive pins 52 of the rotor yoke 5 into a state covering the opening 41 (i.e. a closed state).

The above description is given of the operation according to the two-position switching method in which the coil 2 is normally energized to thereby drive the rotor yoke 5 to the position indicated by the symbol (b) in FIG. 4, and is reversely energized to thereby drive the rotor yoke 5 to the position indicated by the symbol (a) in FIG. 4, and in both of the cases, even after deenergization of the coil 2, the position indicated by the symbol (a) or (b) is maintained. However, the operation which the rotor yoke 5 can perform is not limited to that by the two-position switching method. By properly configuring the tooth width or shape of each of the magnetic pole portions 51 of the rotor yoke 5 and properly setting a voltage to be supplied to the coil 2, the waveform of torque acting on the rotor yoke 5 can be changed as shown in FIG. 5 (a three-position switching method).

Figure 5:
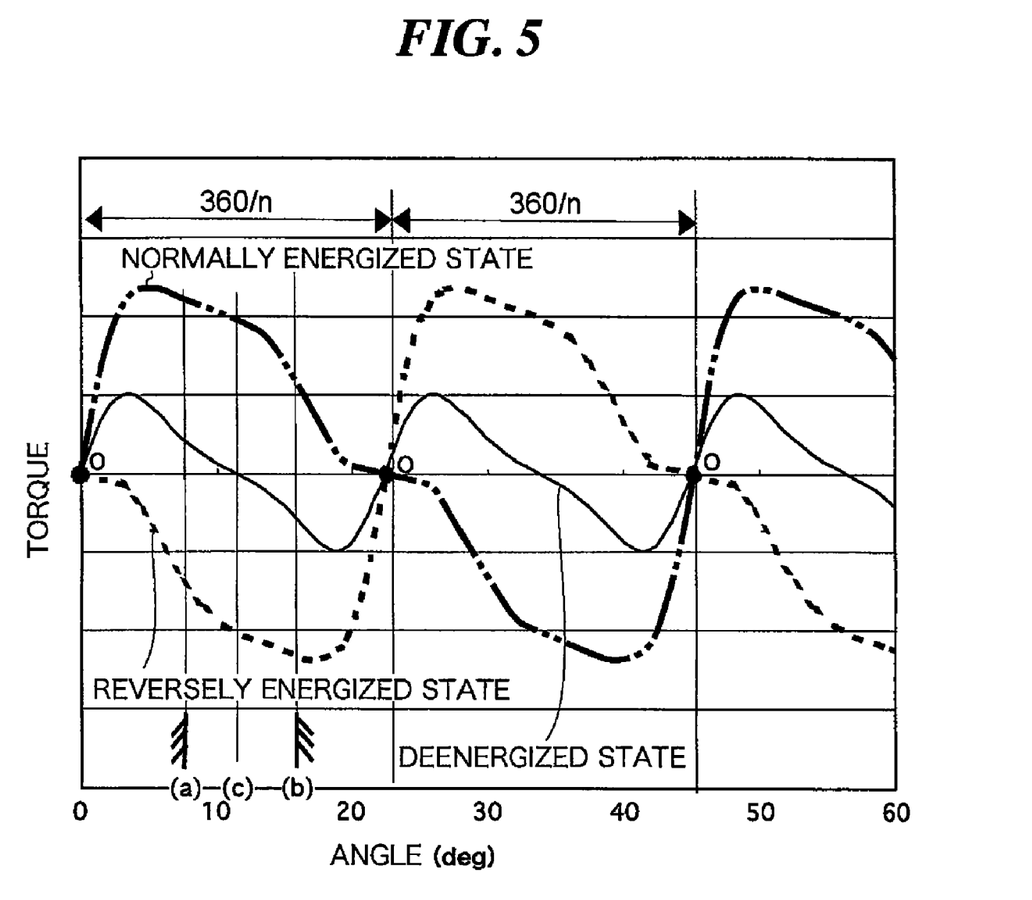
FIG. 5 is a diagram illustrating torque acting on the rotor yoke of the light amount controller when the light amount controller employs a three-position switching method.

FIG. 5 is a diagram showing torque acting on the rotor yoke 5 of the light amount controller when the light amount controller employs the three-position switching method.

Referring to FIG. 5, when the coil 2 is normally energized, positive torque acts on the rotor yoke 5, whereby the rotor yoke 5 rotates to a position indicated by a symbol (b) in FIG. 5. When the coil 2 is reversely energized, negative torque acts on the rotor yoke 5, whereby the rotor yoke 5 rotates to a position indicated by a symbol (a) in FIG. 5. Further, when the coil 2 is deenergized, the rotor yoke 5 rotates to a position indicated by a symbol (c) in FIG. 5, which is a stable position into which the rotor yoke 5 is placed when the coil 2 is in a deenergized state. It is thus possible to cause the rotor yoke 5 to perform operation according to the three-position switching method as well.

Further, it is also possible to use a method different from the two-position switching method and the three-position switching method, in which the rotor, i.e. the rotor yoke 5 is urged by a spring in the direction of rotation, and the voltage applied to the coil 2 is increased or reduced to thereby continuously switch the rotational angle of the rotor yoke 5 (a continuous switching method).

In the case of the continuous switching method, when a maximum voltage is applied to the coil 2, the rotor yoke 5 is rotated to the position indicated by the symbol (b) in FIG. 5, and then as the voltage is progressively reduced, the position where the urging force of the spring and the electromagnetic force of the magnet 1 are balanced with each other gradually changes and moves toward the position indicated by the symbol (a) in FIG. 5. Then, when the coil 2 is deenergized, the rotor yoke 5 operates to move to the position indicated by the symbol (a) in FIG. 5. This operation can be utilized to continuously control the amount of light passing through the opening 41 of the base plate 4.

Next, a description will be given of the advantageous effects of the light amount controller incorporating the driving device according to the present embodiment. In the driving device incorporated in the light amount controller, the rotor or rotary member is implemented by the rotor yoke 5 having the magnetic pole portions 51 formed by axially cutting out the portions of the hollow cylinder. This structure makes it possible to make the moment of inertia of the rotor smaller than that of the driving device disclosed in Japanese Laid-Open Patent Publication (Kokai) No. 2002-272082. The reason for this will be described below.

The moment of inertia of a slim hollow cylindrical object acting about a central axis of the same can be represented as (number $\pi$)×(density)×(thickness)×(height)×(average radius)^3. The moment of inertia of the hollow cylindrical magnet 1 and that of the rotor yoke 5 having the magnetic pole portions 51 will be compared with each other through comparison of density, thickness, height, and shape between the two hollow cylinders.

First, as to density, a material used for the magnet 1 has a density of 7.4 g/cm$^3$ in the case of a neodymium sintered magnet, 8.3 g/cm$^3$ in the case of a samarium cobalt magnet, and 6.0 g/cm$^3$ in the case of a neodymium bond magnet. In contrast, pure iron used for the rotor yoke 5 has a density of 7.0 g/cm$^3$, which is approximately equal to 80 to 120% of the specific gravity of the magnet 1.

Next, as to thickness, the minimum thickness of the magnet 1 is approximately 0.3 to 0.6 mm. If the thickness of the magnet 1 is smaller than this, there occur the problems of reduced rigidity and insufficient magnetization of the magnet 1. In contrast, the minimum thickness of the rotor yoke 5 is 0.15 to 0.3 mm, which is approximately half the minimum thickness of the magnet 1.

As to height, the rotor yoke 5 has a height approximately equal to the sum of the height of the magnet 1 and the height of the coil 2. Therefore, the height of the rotor yoke 5 is approximately twice that of the magnet 1.

As to shape, the magnet 1 has a perfect hollow cylindrical shape, whereas the rotor yoke 5 has the magnetic pole portions 51 formed by axially cutting out portions of the hollow cylinder. The tooth width of each of the magnetic pole portions 51 is smaller than the arc length of each magnetized section of the magnet 1, and the number of the magnetic pole portions 51 is half the number of the magnetized sections of the magnet 1 at the maximum. Therefore, the rotor yoke 5 is formed with cutouts a total arc length of which is not less than 50% of the circumference of the rotor yoke 5.

In summary of the above-described points, when the average radius of the magnet 1 is equal to that of the rotor yoke 5 as in the present embodiment, by using the rotor yoke 5 formed with cutouts as a rotor, it is possible to reduce the moment of inertia by more than 50%. This enables the driving device to open and close the shutter blades 7 at an increased speed, whereby high-speed shutter driving can be achieved.

Further, assuming that the driving device according to the present embodiment and the conventional hollow cylindrical driving device disclosed in Japanese Laid-Open Patent Publication (Kokai) No. 2002-272082 have the same size, the moment of inertia is much smaller in the former, which has the rotor yoke 5 disposed on the innermost periphery thereof, than in the latter, which has the magnet as a rotor disposed close to the radially central part thereof.

As described above, since the conventional driving device uses the magnet as a rotor, when the thickness of the magnet is increased so as to increase a magnetic force and thereby enhance torque, the moment of inertia is also increased to make it impossible to increase shutter speed.

In contrast, according to the driving device of the present embodiment, the rotor is formed by the rotor yoke 5, so that even if the thickness of the magnet 1 is increased, the moment of inertia is not increased. This makes it possible to use the magnet 1 which is increased in thickness such that an increased magnetic force is obtained. In other words, by changing the thickness of a magnet material forming the magnet 1, it is possible to increase the magnetic force acting on the rotor yoke 5 without increasing the moment of inertia of the rotor yoke 5. As a result, a driving device with high torque and a reduced moment of inertia can be realized, that is, high-speed shutter driving can be attained.

Further, in the driving device of the present embodiment, a ferrous material, such as pure iron or silicon steel as a soft magnetic material, is used to form the shutter drive pins 52 and the rotation stopper pin 54 of the rotor yoke 5. This makes it possible not only to form pins having a higher rigidity than that of the pins of the conventional plastic magnetic, but also to reduce the size of each pin with ease. More specifically, it is possible to realize the rotor yoke 5 provided with the shutter drive pins 52 and the rotation stopper pin 54 each having sufficient rigidity, without increasing the number of component parts.

In the driving device of the present embodiment, magnetic flux generated by energization of the coil 2 flows from the hollow cylindrical part 31 of the stator yoke 3 to the magnetic pole portions 51 of the rotor yoke 5, or flows reversely, to efficiently act on the magnet 1 positioned between the magnetic pole portions 51 of the rotor yoke 5 and the hollow cylindrical part 31 of the stator yoke 3.

In this case, the distance between the hollow cylindrical part 31 of the stator yoke 3 and the magnetic pole portions 51 of the rotor yoke 5 can be set to the sum of the thickness of the magnet 1 and the clearance between the magnet 1 and each magnetic pole portion 51 of the rotor yoke 5. This makes it possible to make the distance between the stator and the rotor shorter than in the conventional driving device disclosed in Japanese Laid-Open Patent Publication (Kokai) No. 2002-272082, to thereby reduce magnetic resistance. Therefore, it is possible to generate more magnetic fluxes with less electric current, thereby enhancing the efficiency of the driving device.

Further, since the rotor of the driving device of the present embodiment is in the form of a slim hollow cylinder, a large-diameter magnet can be used, which makes it possible to increase torque of the driving device. Furthermore, since the opening of the driving device can be utilized as an optical path, it is possible to reduce the size of the light amount controller incorporating the driving device.

As described above, according to the present embodiment, since the rotor yoke 5 used as a rotor is formed with cutouts, it is possible to provide the driving device of which the rotor yoke 5 has a reduced moment of inertia.

Further, since the rotor is implemented by the rotor yoke 5, even if the thickness of a magnet material forming the magnet 1 is increased, the moment of inertia of the rotor yoke 5 cannot be adversely affected, so that it is possible to provide the driving device which achieves increase in torque and reduction in the moment of inertia in a compatible manner.

Furthermore, according to the present embodiment, it is possible to provide the driving device provided with the small-sized and sufficiently rigid rotor yoke 5, without increasing the number of component parts.

Moreover, it is possible to provide the light amount controller which is capable of increasing the driving speed of the light amount adjusting mechanism using the driving device as a drive source thereof.

Next, a description will be given of a second embodiment of the present invention.

Figure 6:
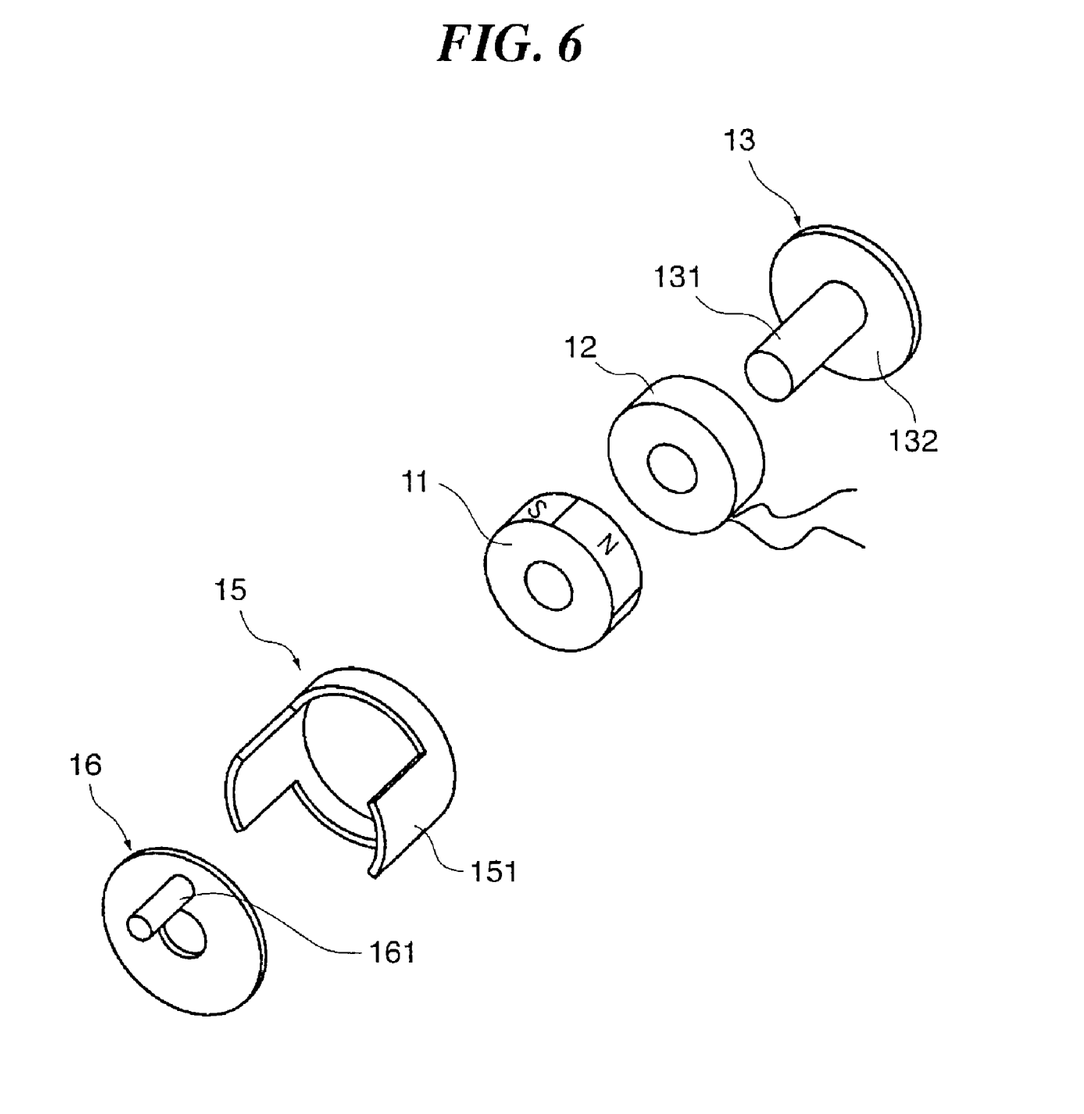
FIG. 6 is an exploded perspective view of a driving device according to a second embodiment of the present invention.
Figure 7:
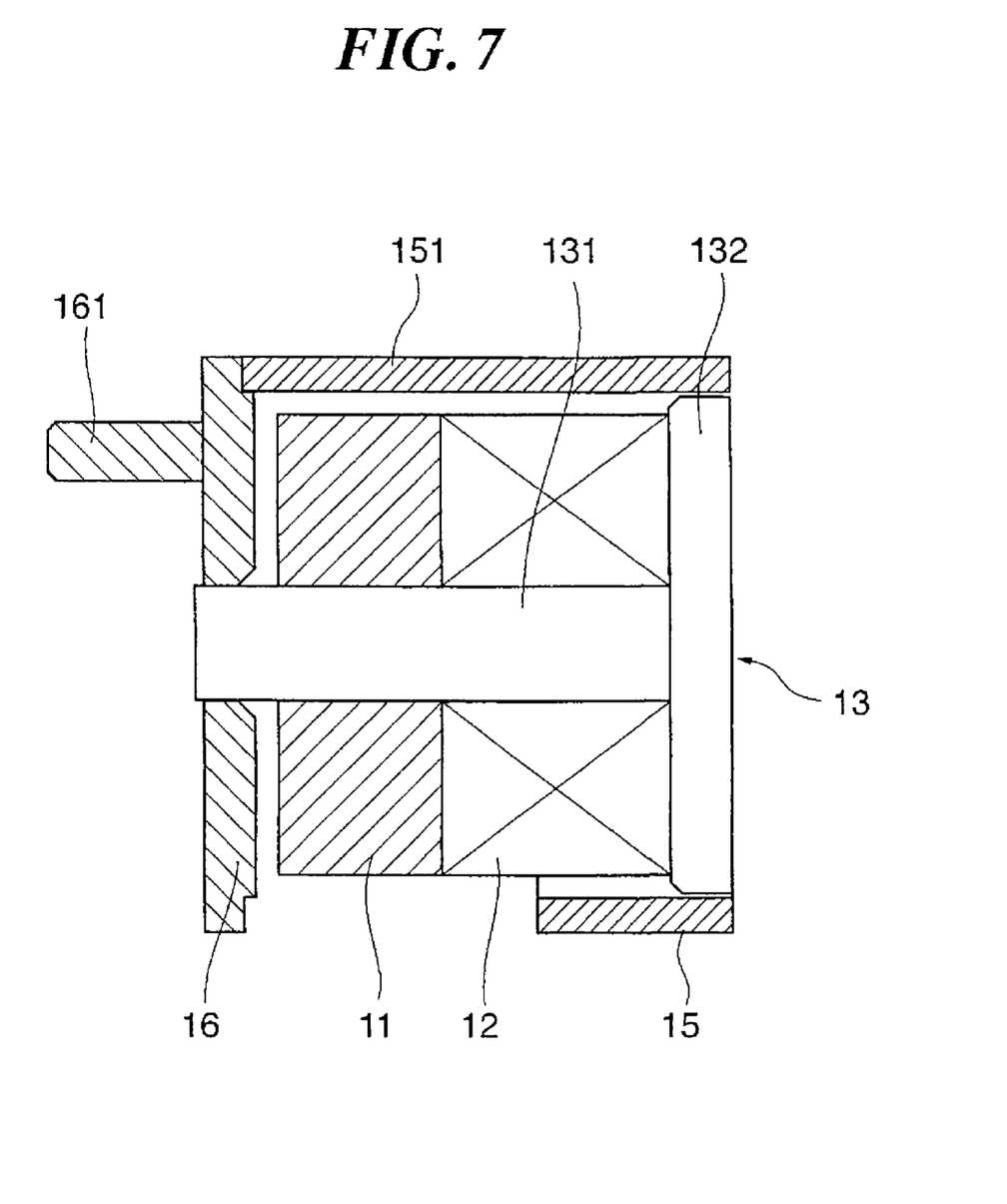
FIG. 7 is a cross-sectional view in the axial construction of the driving device in FIG. 6 in an assembled state thereof.

FIG. 6 is an exploded perspective view of a driving device according to the second embodiment. FIG. 7 is a cross-sectional view in the axial direction of the driving device in FIG. 6 in an assembled state thereof.

As shown in FIGS. 6 and 7, the driving device is comprised of a magnet 11, a coil 12, a stator yoke 13, a rotor yoke 15, and a rotor pin 16.

The magnet 11 is in the form of a hollow cylinder, and has an outer peripheral surface thereof circumferentially divided into n sections (four sections in the present embodiment) magnetized such that they have alternately different S and N poles (outer-periphery magnetization). The magnet 11 is disposed on an inner periphery side of the rotor yoke 15 when the driving device is assembled.

The coil 12 is formed by numerous lead wires wound into a general hollow cylindrical form, and is disposed coaxially with the magnet 11 in axially side-by-side relation thereto when the driving device is assembled. The coil 12 is configured to have an outer diameter approximately equal to that of the magnet 11, and an inner diameter approximately equal to that of the magnet 11.

The stator yoke 13 is formed of a soft magnetic material, and is comprised of a shaft part 131 having a generally cylindrical shape and extending along the axis of the magnet 11, and a magnetic flux-transmitting part 132 having a disk shape and supporting the shaft part 131. The shaft part 131 is configured to have an outer diameter approximately equal to an inner diameter of the magnet 11. The magnetic flux-transmitting part 132 is configured to have an outer diameter slightly larger than that of the magnet 11.

The rotor yoke 15 is formed of a soft magnetic material, and has magnetic pole portions 151 formed by axially cutting out lateral portions of the rotor yoke 15 such that the magnetic pole portions 151 are each comb-tooth shaped. The magnetic pole portions 151 are each configured to have an axial length larger than that of the magnet 11, and an arc length (tooth width) smaller than that of each magnetized section of the magnet 11. The number of the magnetic pole portions 151 can be set to one to n/2 (n represents the number of magnetic poles of the magnet 11), and in the present embodiment, it is set to two.

The rotor pin 16 is formed of a plastic material which has a small specific gravity and is excellent in slidability, such that it is generally disk-shaped. The rotor pin 16 is provided with e.g. one shutter drive pin 161 which is formed in an axially projecting manner.

In the present embodiment, a stator is formed by rigidly fitting the magnet 11 and the coil 12 on the shaft part 131 of the stator yoke 13. On the other hand, a rotor is formed by fixing the rotor pin 16 and the rotor yoke 15 coaxially with each other. The rotor can perform rotation with respect to the stator within a range of 360/n degrees or less in a manner limited by an rotation restricting mechanism, not shown. In this case, the magnetic pole portions 151 of the rotor yoke 15 are configured to be opposed to the magnetized sections of the magnet 11.

Magnetic flux generated by energization of the coil 12 extends round through the shaft part 131 of the stator yoke 13, the magnetic flux-transmitting part 132 of the same, the magnetic pole portions 151 of the rotor yoke 15, and the magnet 11 to form a loop. As a consequence, the magnetic pole portions 151 of the rotor yoke 15 are magnetized, and hence the rotor yoke 15 receives torque due to magnetic action between the magnetic pole portions 151 and the magnet 11.

Thus, in the driving device according to the present embodiment as well, it is possible to switch the direction of energization of the coil 12, as in the above-described first embodiment, to thereby cause the rotor yoke 15 to perform rotation within a range limited by the above described rotation restricting mechanism. Similarly to the driving device according to the first embodiment, the present driving device can be utilized not only for a light amount controller, but also for a lens driving device and various kinds of switches.

Since the driving device according to the present embodiment is in a solid form, reduction of the diameter thereof can be achieved. In the case where a light amount controller is formed by a driving device and a light amount adjusting mechanism (shutter blades and a base plate), the present driving device with a reduced diameter is more difficult to cause interference with other component parts (a lens support lever, a focus motor, etc.) than the above-described hollow cylindrical driving device according to the first embodiment, and further, it is easy to use the driving device for another light amount adjusting mechanism different in size.

The driving device according to the present embodiment is the outer-periphery magnetization type in which the outer peripheral surface of a magnet is magnetized. To reduce the moment of inertia of a rotor, it is more effective to employ the inner-periphery magnetization type in which the inner peripheral surface of a magnet is magnetized and dispose the rotor yoke along the innermost periphery of the driving device, as in the first embodiment. However, as the diameter of a magnet is further reduced, it is more difficult to magnetize the inner peripheral surface of the magnet, and hence sufficient magnetization becomes impossible. As a result, it may become necessary to provide two magnets as a countermeasure, which causes an increase in the manufacturing costs.

In contrast, in the case where the magnet of the outer-periphery magnetization type is employed as in the present embodiment, even when the size of the driving device is reduced, a strong magnet can be used, which makes it possible to reduce the cost required for the magnet.

As described above, according to the present embodiment, since the rotor yoke 15 used as a rotor is formed with cutouts, it is possible to provide the driving device of which the rotor yoke 15 has a reduced moment of inertia.

Further, since the rotor is implemented by the rotor yoke 15, even if the thickness of a magnet material forming the magnet 11 is increased, the moment of inertia of the rotor yoke 15 cannot be adversely affected, so that it is possible to provide the driving device which achieves increase in torque and reduction in the moment of inertia in a compatible manner.

Furthermore, according to the present embodiment, it is possible to provide the driving device provided with the small-sized and sufficiently rigid rotor yoke 15, without increasing the number of component parts.

It should be noted that the present invention is not limited to the above-described embodiments. As is apparent from the first embodiment in which the driving device is in the hollow form, and the second embodiment in which the driving device is in the solid form, the present invention is not limited to a driving device in a specific form, but may be in a solid or hollow form.

As is apparent from the first embodiment in which the magnetized sections are arranged in the inner peripheral surface of the magnet (inner-periphery magnetization) and the second embodiment in which the magnetized sections are arranged in the outer peripheral surface of the magnet (outer-periphery magnetization), the present invention is not limited to a driving device employing a magnet of a specific magnetization type, but the magnet may be of an inner-periphery magnetization type or an outer-periphery magnetization type.

Although in the first embodiment, the rotor yoke 5 is formed with eight magnetic pole portions 51, by way of example, this is not limitative but the number of the magnetic pole portions 51 is only required to be set within the range of 1 to n/2 (n represents the number of the magnetized sections of a magnet).

Although in the second embodiment, the rotor yoke 15 is formed with two magnetic pole portions 151, by way of example, this is not limitative but the number of the magnetic pole portions 151 is only be required to be set within the range of 1 to n/2 (n represents the number of the magnetized sections of a magnet).

This application claims the benefit of Japanese Application No. 2005-216060, filed Jul. 26, 2005, which is hereby incorporated by reference herein in its entirety.

What is claimed is:

1. A driving device comprising:
a magnet that is formed to have a hollow cylindrical shape and has magnetized sections which are magnetized to have alternately different poles in a circumferential direction thereof;
a coil that is wound coaxially with said magnet and is disposed in axially side-by-side relation to said magnet;
a stator yoke that is formed of a soft magnetic material and has said magnet and said coil fixed thereto;
a rotor yoke that is formed of a soft magnetic material, and has magnetic pole portions formed in opposed relation to said magnetized sections, for being magnetized by said coil, said rotor yoke being supported in a manner rotatable with respect to said magnet, said coil, and said stator yoke, wherein said rotor yoke further comprises an interlock portion for interlocking with an object to be rotated; and
a rotation restricting part that limits a range of rotation of said rotor yoke within a predetermined angle.

2. A driving device as claimed in claim 1, wherein the predetermined angle is not more than an angle obtained by dividing 360 degrees by the number of magnetic poles of said magnetized sections of said magnet.

3. A driving device as claimed in claim 1, wherein said magnetic pole portions of said rotor yoke each have a comb-tooth shape formed by cutting out lateral portions of said rotor yoke.

4. A driving device as claimed in claim 1, wherein said magnet has said magnetized sections provided in an inner peripheral surface thereof, and is disposed on an outer periphery side of said rotor yoke.

5. A driving device as claimed in claim 1, wherein said magnet has said magnetized sections provided in an outer peripheral surface thereof, and is disposed on an inner periphery side of said rotor yoke.

6. A driving device as claimed in claim 1, wherein a rotation drive method of said rotor yoke is selected from the group consisting of a method of switching an angular position of said rotor yoke to respective positions of opposed ends of the range of rotation of said rotor yoke set within the predetermined angle, a method of switching the angular position of said rotor yoke to the respective positions of the opposed ends of the range of rotation of said rotor yoke and a position between the opposed ends, and a method of continuously switching the angular position of said yoke within the range of rotation of said rotor yoke.

7. A light amount control device comprising:
a fixing member that has an opening;
a light amount control member that controls an amount of opening of said opening of said fixing member;
a magnet that is formed to have a hollow cylindrical shape and has magnetized sections which are magnetized to have alternately different poles in a circumferential direction thereof;

a coil that is wound coaxially with said magnet and is disposed in axially side-by-side relation to said magnet;

a stator yoke that is formed of a soft magnetic material and has said magnet and said coil fixed thereto; and a rotor yoke that is formed of a soft magnetic material, and has magnetic pole portions formed in opposed relation to said magnetized sections, for being magnetized by said coil, said rotor yoke being supported in a manner rotatable with respect to said magnet, said coil, and said stator yoke, wherein said rotor yoke further comprises an interlock portion for interlocking with said light amount control member, and wherein said fixing member further comprises a rotation restricting part that limits a range of rotation of said rotor yoke within a predetermined angle, and fixes said stator yoke thereto.

8. A light amount control device as claimed in claim 7, wherein the predetermined angle is not more than an angle obtained by dividing 360 degrees by the number of magnetic poles of said magnetized sections of said magnet.

9. A light amount control device as claimed in claim 7, wherein said magnetic pole portions of said rotor yoke each have a comb-tooth shape formed by cutting out lateral portions of said rotor yoke.

10. A light amount control device as claimed in claim 7, wherein said magnet has said magnetized sections provided in an inner peripheral surface thereof, and is disposed on an outer periphery side of said rotor yoke.

11. A light amount control device as claimed in claim 7, wherein said magnet has said magnetized sections provided in an outer peripheral surface thereof, and is disposed on an inner periphery side of said rotor yoke.

12. A light amount control device as claimed in claim 7, wherein a rotation drive method of said rotor yoke is selected from the group consisting of a method of switching an angular position of said rotor yoke to respective positions of opposed ends of the range of rotation of said rotor yoke set within the predetermined angle, a method of switching the angular position of said rotor yoke to the respective positions of the opposed ends of the range of rotation of said rotor yoke and a position between the opposed ends, and a method of continuously switching the angular position of said rotor yoke within the range of rotation of said rotor yoke.

\* \* \* \* \*